J. B. WHITTAKER.
NUT AND BOLT LOCK.
APPLICATION FILED MAY 13, 1921.
1,406,315.
Patented Feb. 14, 1922.
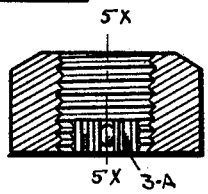
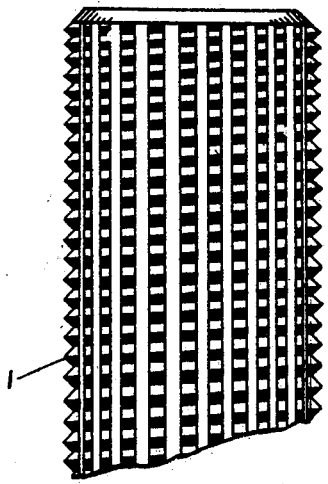
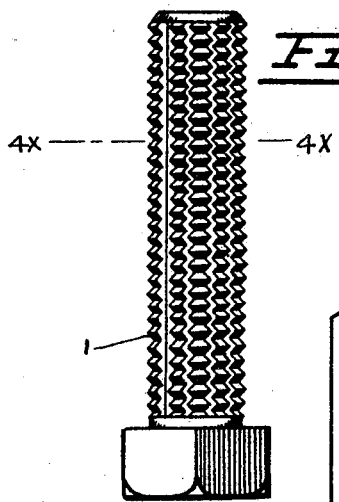
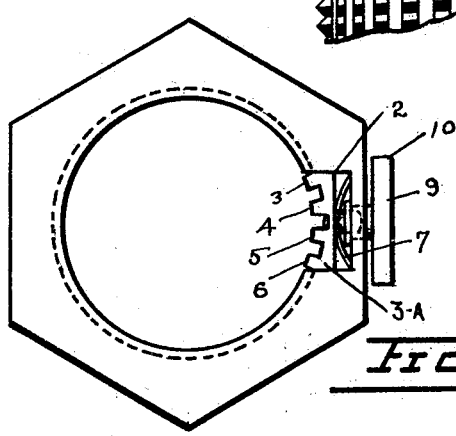
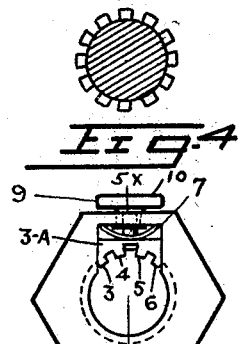
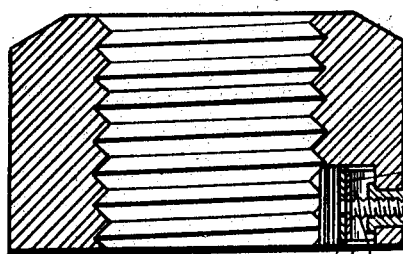
Inventor
James B. Whittaker
By Frank Keifer
Attorney

UNITED STATES PATENT OFFICE.

JAMES B. WHITTAKER, OF ROCHESTER, NEW YORK.

NUT AND BOLT LOCK.

1,406,315.	Specification of Letters Patent.	Patented Feb. 14, 1922.

Application filed May 13, 1921. Serial No. 469,346.

*To all whom it may concern:*

Be it known that I, JAMES B. WHITTAKER, a citizen of the United States, residing at Rochester, in the county of Monroe and State of New York, have invented certain new and useful Improvements in Nut and Bolt Locks, of which the following is a specification.

The object of this invention is to provide a new and improved form of nut and bolt lock.

This and other objects of this invention will be fully illustrated in the drawing, described in the specification, and pointed out in the claims at the end thereof.

In the drawings:

Figure 1 is a sectional elevation of the nut provided with my improved lock.

Figure 2 is a side elevation of the bolt for use with my improved lock.

Figure 3 is an end elevation of the nut.

Figure 4 is cross section of the bolt, the section being taken on the line $4^\times$ $4^\times$ of Figure 2.

Figure 5 is a sectional elevation of the nut on an enlarged scale, the section being taken on the line $5^\times$ $5^\times$ of the Figures 1 and 3.

Figure 6 is a side elevation of a bolt of large size adapted to be used with my invention, partly broken away.

Figure 7 is a top plan view of a nut embodying my invention to be used with the bolt shown in Figure 6.

In the drawings like reference numerals indicate like parts.

In the drawing: reference numeral 1 indicates the bolt which is provided with screw threads in the ordinary way. The threads of this screw are slotted transversely by radial slots extending along the bolt and across the threads. These radial slots are shown in end elevation of Figure 4. This changes the thread on the bolt from a single continuous thread to a series of short mutilated sections of thread, the sections being spaced apart by slots.

The nut preferably has the shape of an ordinary hexagon nut threaded in the usual way. The nut is recessed as indicated at 2. The recess includes about one sixth of the angular measurement of the inside of the nut and about one third of the width of the nut, as shown in the drawings, although these dimensions may be varied from at will. In this recess is mounted on the slide a plate $3^A$ having a series of teeth thereon 3, 4, 5, and 6. These teeth extend from the top to the bottom of the plate or across the full depth of the recess.

These teeth are adapted to engage with the recesses that are cut across the threads. The four teeth will engage in four recesses and prevent the nut from turning on the bolt. The plate $3^A$ is pressed forward by a spring 7 which spring is preferably bow shaped and is perforated to receive the stem 8 of the screw. In engagement with this screw is placed the sleeve 9 which turns in the opening of the nut provided therefor. As the sleeve 9 turns it engages with the thread on the stem 8 and draws the plate $3^A$ backward, or allows it to go forward. The sleeve 9 has a head 10 thereon by which the sleeve is turned and the screw 8 and the plate $3^A$ is moved in and out. It is understood that the stem 8 is made integral with the plate or key $3^A$, the whole being cut from a solid block or the stem can be riveted therein so that it will not turn thereon. It will also be understood that this key will prevent the nut from turning in either direction.

I claim:

1. A nut and bolt lock, comprising a bolt having grooves extending along the bolt and across the threads, a key mounted in the nut having stationary teeth thereon adapted to engage with a plurality of said grooves, means for positively moving said key into and out of engagement with said grooves without moving the bolt.

2. A nut and bolt lock, comprising a bolt having grooves extending along the bolt and across the threads, a key mounted in the nut having stationary teeth thereon adapted to engage with a plurality of said grooves, a threaded stem integral with said key, a sleeve mounted to rotate in said nut engaging with said stem to move the stem and key.

3. A nut and bolt lock, comprising a bolt having grooves extending along the bolt and across the threads, a key mounted in the nut having stationary teeth thereon adapted to engage with a plurality of said grooves, a threaded stem integral with said key, a sleeve mounted to rotate in said nut engaging with said stem to move the stem and key, a bow spring engaging with said key to move it in one direction.

In testimony whereof I affix my signature.

JAMES B. WHITTAKER.